United States Patent
Hayakawa et al.

(10) Patent No.: US 9,614,448 B2
(45) Date of Patent: Apr. 4, 2017

(54) SWITCHING POWER-SUPPLY DEVICE

(71) Applicant: Sanken Electric Co., LTD., Niiza-shi, Saitama (JP)

(72) Inventors: Akira Hayakawa, Niiza (JP); Masaaki Shimada, Niiza (JP); Yoichi Terasawa, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 10 days.

(21) Appl. No.: 14/631,491

(22) Filed: Feb. 25, 2015

(65) Prior Publication Data
US 2015/0249380 A1    Sep. 3, 2015

(30) Foreign Application Priority Data

Feb. 28, 2014 (JP) .................................. 2014-038340

(51) Int. Cl.
 *H02M 3/335* (2006.01)
 *H02M 1/36* (2007.01)
 *H02M 1/00* (2006.01)

(52) U.S. Cl.
 CPC .......... *H02M 3/33523* (2013.01); *H02M 1/36* (2013.01); *H02M 2001/0029* (2013.01); *H02M 2001/0051* (2013.01); *Y02B 70/1491* (2013.01)

(58) Field of Classification Search
 CPC .............. Y02B 70/1433; H02M 3/335; H02M 3/33523; H02M 3/33592; H02M 3/33507; H02M 3/525

(Continued)

(56) References Cited

U.S. PATENT DOCUMENTS 7,760,520 B2 * 7/2010 Jang ........................ H02M 1/32
  363/21.18
8,693,216 B2 * 4/2014 Moon ..................... H02M 1/36
  323/901

(Continued)

FOREIGN PATENT DOCUMENTS

JP   2007-143230 A   6/2007
JP   2007-215316 A   8/2007

(Continued)

OTHER PUBLICATIONS

Jan. 19, 2016—(JP) Notification of Reasons for Refusal—App 2014-038340, Eng Trans.

*Primary Examiner* — Nguyen Tran
(74) *Attorney, Agent, or Firm* — Banner & Witcoff, Ltd.

(57) ABSTRACT

A switching power-supply device, in which an input power is applied to a primary winding of a transformer, a pulse voltage is induced in a secondary winding of the transformer by turning on and off a switching element connected to the primary winding of the transformer and an output voltage rectified and smoothed by a secondary-side rectifying-and-smoothing circuit having a rectifier diode and a smoothing capacitor is outputted. The switching power-supply device includes: a transient state detection circuit, which detects a transient state and outputs a soft-drive instruction signal; and a drive circuit which turns on-and-off the switching element in a soft-drive operation, in which a charging speed of a gate voltage at a time of passing a gate threshold voltage is delayed as compared to a normal operation, in a case where the soft-drive instruction signal is inputted.

5 Claims, 11 Drawing Sheets

(58) Field of Classification Search
USPC ... 363/21.02–21.11, 21.12–21.18, 49, 95, 97
See application file for complete search history.

(56) References Cited

U.S. PATENT DOCUMENTS

2013/0343097 A1    12/2013  Chen
2015/0117072 A1*   4/2015   Jao ......................... H02M 1/36
                                                          363/21.17

FOREIGN PATENT DOCUMENTS

JP    2009-194514 A    8/2009
JP    2014-003837 A    1/2014

* cited by examiner

SWITCHING POWER-SUPPLY DEVICE

CROSS-REFERENCE TO RELATED APPLICATION

This application claims priority from Japanese Patent Application No. 2014-038340 filed on Feb. 28, 2014, the entire subject matter of which is incorporated herein by reference.

TECHNICAL FIELD

This disclosure relates to a switching power-supply device performing a control of an output voltage by switching operation and a switching control circuit.

BACKGROUND

There is a technology, in which only when a current peak value is large, such as upon starting, a gate resistance upon turn-off is increased such that a turn-off fall time of a switching element is extended, thereby reducing a surge voltage (e.g., see JP-A-2007-143230). In JP-A-2007-143230, the gate resistance upon turn-off is increased in a case of conditions such as upon starting, so that a surge voltage of a drain-to-source voltage $V_{DS}$ of the switching element is limited. Therefore, this is effective in the case of a quasi-resonant control, in which the drain-to-source voltage $V_{DS}$ of the switching element is likely to be increased.

SUMMARY

However, when a switching operation is performed by PWM control, the operation is likely to be performed as a continuous mode during a transient state (upon starting/overload), thereby it is likely to increase a discharging current upon turn-on. Further, when a voltage resonant capacitor is incorporated between the drain and the source as a noise countermeasure or the like, it is further likely to increase the discharging current upon turn-on. Upon starting, a soft start is performed and also a leading edge blanking function is stopped, thereby discharging current upon turn-on is limited. However, the discharging current upon turn-on is caused as a surge voltage in a rectifier diode on a secondary side or a rectifier diode of an IC power-supply voltage Vcc. When the discharging current is large, the surge voltage generated in the rectifier diode on the secondary side or the rectifier diode of the IC power-supply voltage Vcc is also increased. Accordingly, as the rectifier diodes for the secondary side or the IC power-supply voltage Vcc, diodes having a higher withstand voltage is used with considering the generated surge voltage. In such higher withstand voltage rectifier diodes, a forward voltage VF is also generally increased, thereby increasing a loss and thus deteriorating a power-supply efficiency.

In view of the above, this disclosure is to provide a switching power-supply device in which a discharging current upon turn-on can be limited and thus a surge voltage which would be generated in rectifier diodes can be limited.

This disclosure is to provide a switching power-supply device, in which an input power is applied to a primary winding of a transformer, a pulse voltage is induced in a secondary winding of the transformer by turning on and off a switching element connected to the primary winding of the transformer and an output voltage rectified and smoothed by a secondary-side rectifying-and-smoothing circuit having a rectifier diode and a smoothing capacitor is outputted. The switching power-supply device includes: a transient state detection circuit, which detects a transient state and outputs a soft-drive instruction signal; and a drive circuit which turns on-and-off the switching element in a soft-drive operation, in which a charging speed of a gate voltage at a time of passing a gate threshold voltage is delayed as compared to a normal operation, in a case where the soft-drive instruction signal is inputted.

In the above described switching power-supply device, the drive circuit may be configured to restore the charging speed of the gate voltage to a speed in the normal operation after the gate voltage passes the gate threshold voltage.

In the above described switching power-supply device, the transient state detection circuit may be configured to detect, as the transient state, a preset period from a time of starting to output the soft-drive instruction signal.

In the above described switching power-supply device, the transient state detection circuit may be configured to detect, as the transient state, a period from a time of starting until a drain current of the switching element oscillates due to responsibility of a feedback control after the output voltage reaches a steady voltage.

In the above described switching power-supply device, the transient state detection circuit may be configured to detect, as the transient state, an overload state detected by a feedback signal from the secondary side and to output the soft-drive instruction signal during a preset period of time.

In the above described switching power-supply device, the transient state detection circuit may be configured to detect, as the transient state, an overload state detected by an drain current of the switching element and to output the soft-drive instruction signal during a preset period of time.

In the above described switching power-supply device, the switching power-supply device may have an auto-restart function of restarting the controller to turn on-and-off the switching element, and the switching power-supply device may include a restarting delay circuit to delay an auto-restart cycle upon restarting from stop due to a continuous overload state.

According to this disclosure, a discharging current upon turn-on can be limited and a surge voltage generated in rectifier diodes can be limited, Therefore, diodes having a lower withstand voltage to be used as rectifier diodes for the secondary side or the IC power-supply voltage.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
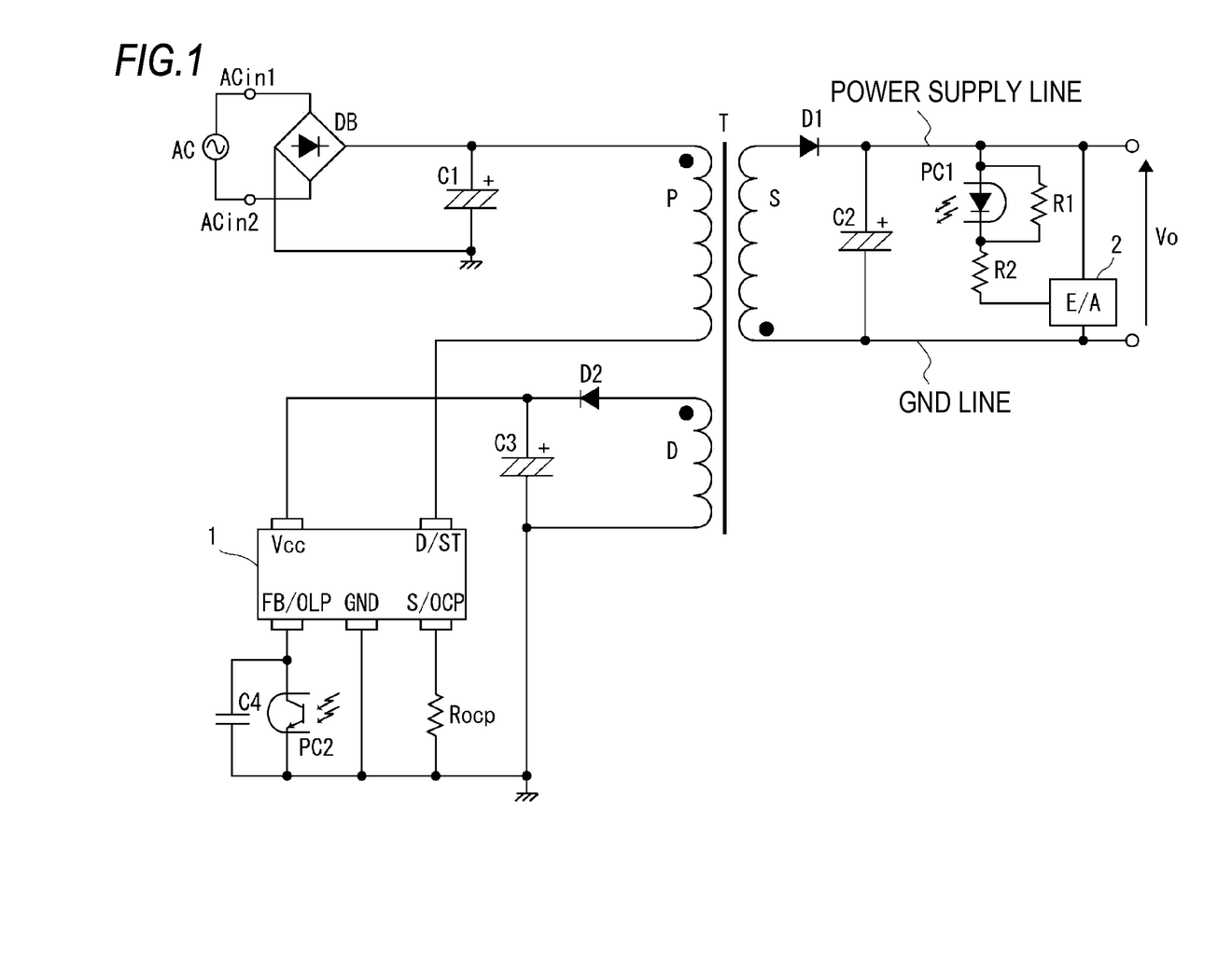
FIG. 1 is a circuit configuration diagram showing a circuit configuration of an embodiment of a switching power-supply device according to this disclosure.

Referring to FIG. 1, a switching power-supply device according to the present embodiment includes a rectifier circuit DB, smoothing capacitors C1, C2 and C3, a transformer T, a controller IC 1, rectifier diodes D1 and D2, an error amplifier (E/A) 2, an light emitting diode PC1 and a right receiving transistor PC2, which constitute a photo-coupler, a current detection resistor Rocp, resistors R1 and R2, and a capacitor C4.

A commercial alternating current power source AC is connected to alternating current input terminals ACin1 and ACin2 of the rectifier circuit DB, which has a diode bridged thereto, and an alternating voltage inputted from the commercial alternating current power source AC is full-wave-rectified by and outputted from the rectifier circuit DB. The smoothing capacitor C1 is connected between a rectified output positive terminal and a rectified output negative terminal of the rectifier circuit DB. In addition, the rectified output negative terminal of the rectifier circuit DB is connected to a grounding terminal. Thus, a direct current power source is obtained by rectifying-and-smoothing the commercial alternating current power source AC by the rectifier circuit DB and the smoothing capacitor C1.

The controller IC 1 is equipped therein with a switching element, such as a power MOSFET (Metal Oxide Semiconductor Field Effect Transistor) and a control circuit for performing switching control of the switching element, and the controller IC 1 also includes a D/ST (MOSFET drain/starting current input) terminal, an S/OCP (MOSFET source/overcurrent protection) terminal, a Vcc (IC power-source voltage input) terminal, a FB/OLP (feedback signal input/overload protection signal input) terminal, and a GND terminal.

The transformer T which supplies an electric power from a primary side (input side) to a secondary side (load side) is constituted of a primary winding P, an auxiliary winding D and a secondary winding S, the rectified output positive terminal of the rectifier circuit DB is connected to one end of the primary winding P of the transformer T, the other end of the primary winding P of the transformer T is connected to the D/ST terminal of the controller IC 1, and also the S/OCP terminal of the controller IC 1 is connected to the grounding terminal via the resistor Rocp. Thus, by performing on/off control of the switching element equipped in the controller IC 1, an electric power given to the primary winding P of the transformer T is transmitted to the secondary winding S of the transformer T, and thus a pulsating current is generated in the secondary winding S of the transformer T. Also, the current detection resistor Rocp is connected as a resistor for detecting a current ID flowing through the switching element equipped in the controller IC 1, as a voltage signal $V_{ocp}$. The controller IC 1 has an overcurrent protection (OCP) function of limiting an electric power supplied to the secondary side, if the voltage signal $V_{ocp}$ corresponding to the current flowing through the switching element is equal to or greater than a preset overcurrent threshold.

The smoothing capacitor C2 is connected between both terminals of the secondary winding S of the transformer T via the rectifier diode D1. A voltage induced in the secondary winding S of the transformer T is rectified and smoothed by the rectifier diode D1 and the smoothing capacitor C2, and then a voltage between terminals of the smoothing capacitor C2 is outputted as an output voltage Vo from an output terminal. Meanwhile, a line, which is connected to a positive terminal of the smoothing capacitor C2, becomes a power supply line, whereas a line, which is connected to a negative terminal of the smoothing capacitor C2, becomes a GND line connected to the grounding terminal.

The error amplifier 2 is connected in series between the power supply line and the GND line. The error amplifier 2 is connected between the power supply line and the GND line to control a current flowing through the light emitting diode PC1 of the photo-coupler depending on a difference between the output voltage Vo and a steady voltage. Also, the FB/OLP terminal of the controller IC 1 is connected to the grounding terminal via the light receiving transistor PC2 and the capacitor C4, which are connected in parallel to each other. Thus, a feedback (FB) signal depending on the output voltage is sent from the light emitting diode PC1 on the secondary side to the light receiving transistor PC2 on the primary side, and thus it is inputted, as a voltage signal $V_{FB}$, to the FB/OLP terminal of the controller IC 1. The controller IC 1 controls duty ratios of the switching element on the basis of the voltage signal $V_{FB}$ inputted to the FB/OLP terminal, thereby controlling an amount of electric power to be supplied to the secondary side.

The smoothing capacitor C3 is connected between both terminals of the auxiliary winding D of the transformer T via the rectifier diode D2, and a connection point between the rectifier diode D2 and the smoothing capacitor C3 is connected to the Vcc terminal of the controller IC 1. Thus, a voltage generated in the auxiliary winding D is rectified and smoothed by the rectifier diode D2 and the smoothing capacitor C3, and then the voltage is supplied, as an IC power-source voltage Vcc, to the Vcc terminal of the controller IC 1.

(First Embodiment)

Now, a circuit configuration of a first embodiment of the controller IC 1 shown in FIG. 1 will be described with reference to FIG. 2.

Figure 2:
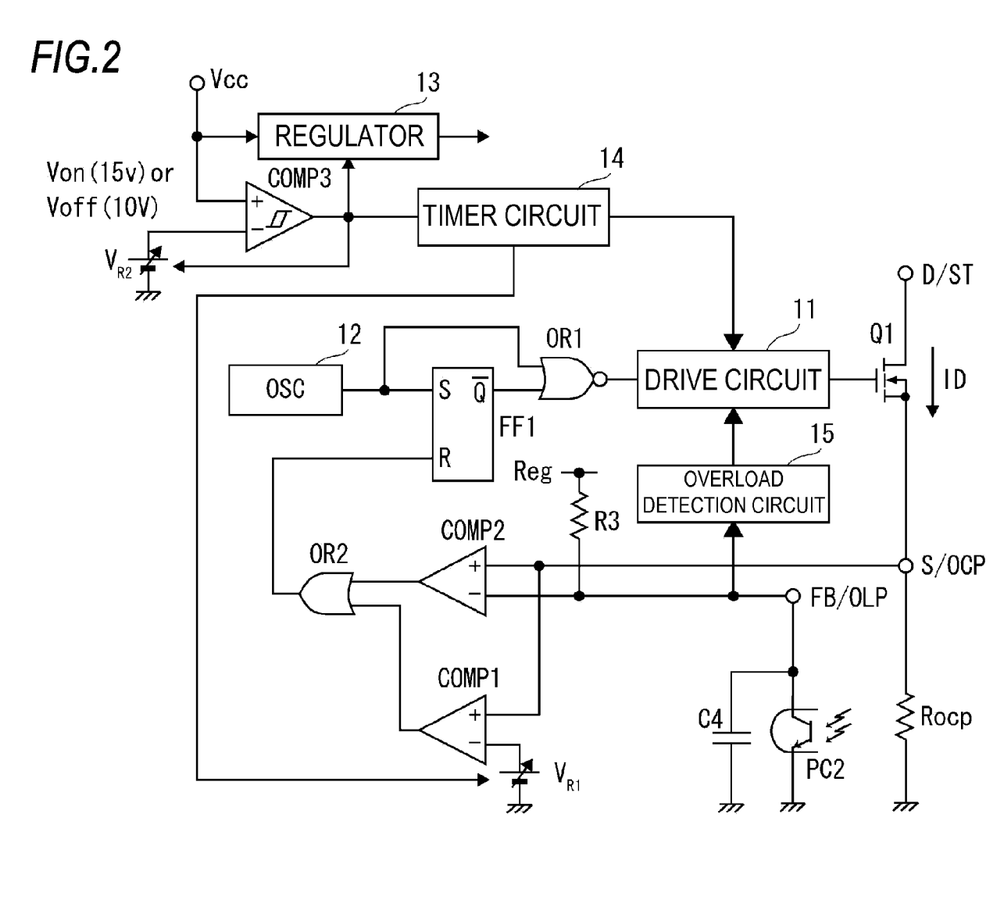
FIG. 2 is a circuit configuration diagram showing a circuit configuration of a first embodiment of a controller IC shown in FIG. 1.

Referring to FIG. 2, the controller IC 1 includes a switching element Q1, which is composed of a N-channel type power MOSFET or the like, a drive circuit 11, an OSC (internal oscillator) 12, a regulator 13, a timer circuit 14, an overload detection circuit 15, variable voltages $V_{R1}$ and $V_{R2}$, OR circuits OR1 and OR 2, a flip-flop FF1, comparators COMP1, COMP2 and COMP3, and a resistor R3.

A drain terminal of the switching element Q1 is connected to the D/TS terminal, a source terminal of the switching element Q1 is connected to the S/OCP terminal, and the drive circuit 11 configured to output a drive signal DRV for driving the switching element Q1 and to control on/off thereof is connected to a gate terminal of the switching element Q1. An output of the OR circuit OR1 is inputted to the drive circuit 11.

An output of the OSC 12 and an output of an inverted output terminal Q⁻ of the flip-flop FF1 are inputted to an input terminal of the OR circuit OR1, an output of the OSC 12 is connected to an S terminal of the flip-flop FF1, and an output of the OR circuit OR2 is connected to an R terminal of the flip-flop FF1. Meanwhile, a pulse width of a clock signal outputted from the OSC 12 is set to be smaller than a minimum ON time width of the switching element Q1. The flip-flop FF1 serves as a PWM latch circuit. Thus, if the output signal of the OSC 12 is an L level (a state where the clock signal is not outputted) and also the flip-flop FF1 is set so that the output signal of the inverted output terminal Q⁻ is a low level, an H level output signal from the OR circuit OR1 is inputted to the drive circuit 11, thereby turning on the switching element Q1.

The S/OCP terminal is connected to both of a non-inverted terminal of the comparator COMP 1 and a non-inverted terminal of the comparator COMP 2. The comparator COMP 1 is an OCP comparator intended to detect an overcurrent, and the variable voltage $V_{R1}$, which is set to an overcurrent threshold during a normal operation, is connected to an inverted terminal thereof. During a normal operation, when the voltage signal $V_{ocp}$ of the S/OCP terminal corresponding to the drain current ID flowing through the switching element Q1 is equal to or greater than the overcurrent threshold, an H level output signal is outputted from the comparator COMP 2. As the output signal of the comparator COMP1 becomes an H level, the flip-flop FF1 is reset via the OR circuit OR2, so that the output signal of the OR circuit OR1 becomes an L level, thereby turning off the switching element Q1.

The comparator COMP 2 is a current sense converter intended to perform feedback control for controlling duty ratios of the switching element Q1 on the basis of a FB signal inputted as a voltage signal $V_{FB}$ to the FB/OLP terminal. The inverted input terminal of the comparator COMP2 is connected to the FB/OLP terminal, which is connected to a reference voltage Reg via the resistor R3. In the comparator COMP2, the voltage signal $V_{ocp}$ and the voltage signal $V_{FB}$ are compared to each other, and if the voltage signal $V_{ocp}$ is equal to or greater than the voltage signal $V_{FB}$, an H level output signal is outputted from the comparator COMP2. As the output signal of the comparator COMP2 becomes the H level, the flip-flop FF1 is reset by the OR circuit OR2 so that the output signal of the OR circuit OR1 becomes an L level, thereby turning off the switching element Q1. Thus, the feedback control for controlling duty ratios of the switching element Q1 is performed on the basis of the FB signal.

The comparator COMP 3 is a comparison circuit intended to compare the power-source voltage Vcc for the Vcc terminal of the IC with the variable voltage $V_{R2}$. The comparator COMP3 has a non-inverted input terminal connected to the Vcc terminal and an inverted input terminal connected to the variable voltage $V_{R2}$. An output signal from the comparator COMP3 is inputted to the variable voltage $V_{R2}$. The variable voltage $V_{R2}$ is set to a first reference voltage Von (e.g., 15V) in case where an output signal from an UVLO circuit COMP1 is an L level, and also the variable voltage $V_{R2}$ is set to a second reference voltage Voff (e.g., 10V), which is lower than the first reference voltage Von, in a case the output signal from the UVLO circuit COMP1 is an H level. Thus, the output signal from the comparator COMP3 has hysteresis characteristic, and becomes an H level if the smoothing capacitor C3 shown in FIG. 1 is charged by a starting circuit thus the IC power-source voltage Vcc exceeds the first reference voltage Von (not shown) and becomes an L level if the IC power-source voltage Vcc is equal to or lower than the second reference voltage Voff.

Also, an output terminal of the comparator COMP3 is connected to a regulator 13. The regulator 13 is supplied with an electric power from the Vcc terminal and when the output signal of the comparator COMP3 is the H level, is operated to supply a power-source voltage for operating each part of the controller IC 1 thereto. Namely, the output signal of the comparator COMP3 is a signal for controlling on/off of the controller IC 1, and in a normal operation of the controller IC 1 (upon turning on of switching operation), the output signal of the UVLO circuit COMP1 becomes the H level. Therefore, the first reference voltage Von of the variable voltage $V_{R2}$ is an operation start voltage for the controller IC 1 and the second reference voltage Voff of the variable voltage $V_{R2}$ is an operation stop voltage for the controller IC 1.

The output terminal of the comparator COMP3 is connected to the timer circuit 14. The timer circuit 14 detects a starting initiation at a timing where the output of the comparator COMP3 becomes the H level. Also, the timer circuit 14 performs a soft start control for slowly increasing the variable resistance $V_{R1}$ to the overcurrent threshold over a preset period of time from the starting initiation. Further, if the starting initiation is detected, the timer circuit 14 generates a preset soft-drive period Ta and outputs a soft-drive instruction signal to the drive circuit 11 during the soft-drive period Ta.

Figure 3:
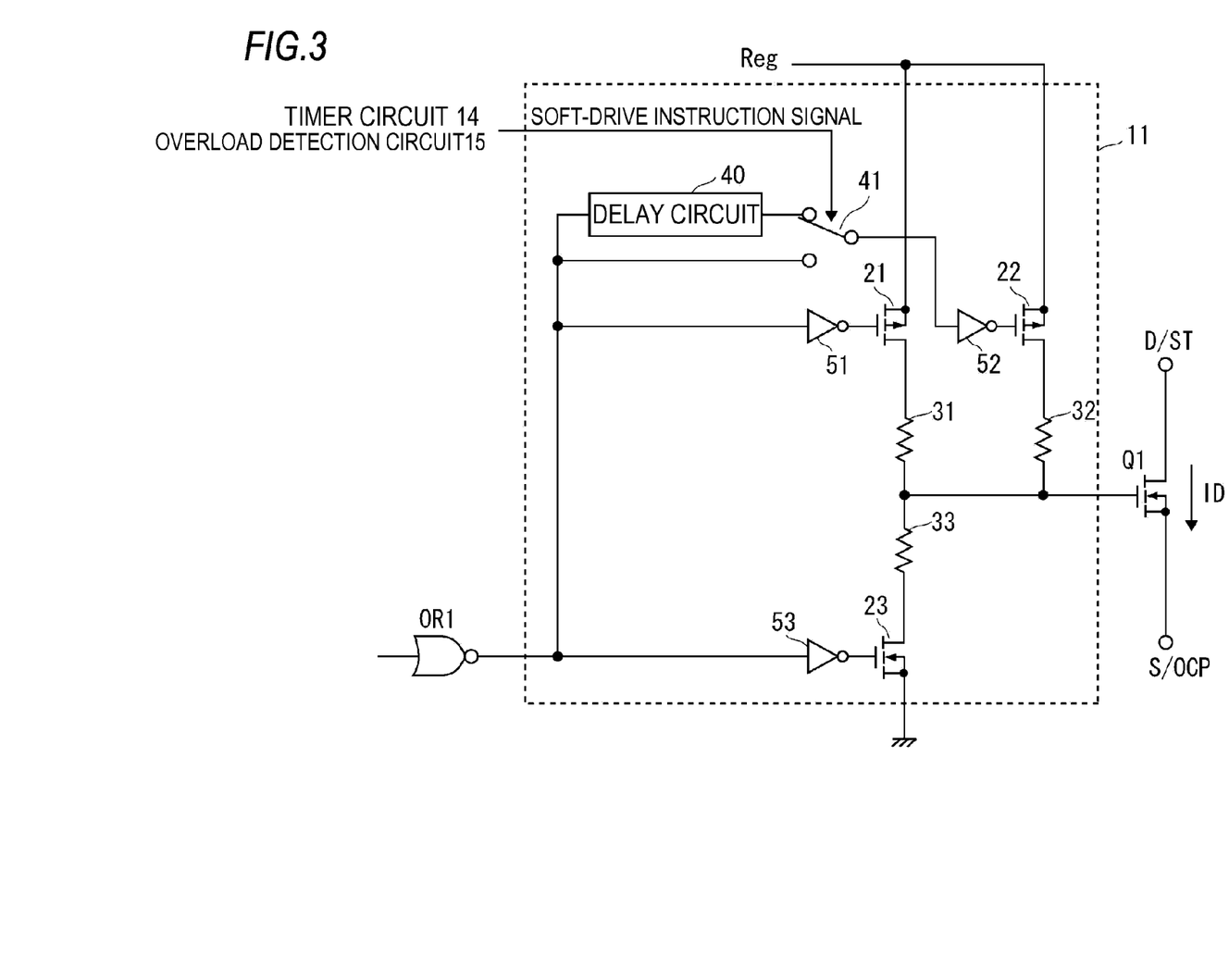
FIG. 3 is a circuit configuration diagram showing a circuit configuration of a drive circuit shown in FIG. 2.

The drive circuit 11 outputs a drive signal for the switching element Q1 on the basis of the output signal of the OR circuit OR1. Referring to FIG. 3, the drive circuit 11 includes a first on-switch element 21 composed of a P-channel type MOSFET, a second on-switch element 22 composed of a P-channel type MOSFET, a first on drive resistance 31, a second on drive resistance 32, an off-switch element 23 composed of an N-channel type MOSFET, an off drive resistance 33, a delay circuit 40, a changeover switch 41 and inverters 51, 52 and 53.

Between the power-source voltage Reg and a gate of the switching element Q1, the first on-switch element 21 and first on-drive resistor 31, which are connected in series to each other, and the second on-switch element 22 and second on-drive resistor 32, which are connected in series to each other, are connected in parallel. Also, an output terminal of the OR circuit OR1 is connected to a gate of the first on-switch element 21 via the inverter 51, and an output terminal of the changeover switch 41 is connected to a gate of the second on switch terminal 22 via the inverter 52. Meanwhile, the output terminal of the OR circuit OR1 is directly connected to one input terminal of the changeover switch 41, and also the output terminal of the OR circuit OR1 is connected to the other terminal of the changeover switch 41 via the delay circuit 40. The off-drive resistor 33 and off-switch element 23, which are connected in series to each other, are connected between the gate of the switching element Q1 and the grounding terminal GND. In a case of the normal operation, the changeover switch 41 is switched to the one input terminal, to which the output terminal of the OR circuit OR1 is directly connected. In a case where the soft-drive instruction signal is inputted thereto, the changeover switch 41 is switched to the other input terminal thereof, to which the output terminal of the OR1 is connected via the delay circuit 40.

Figure 4:
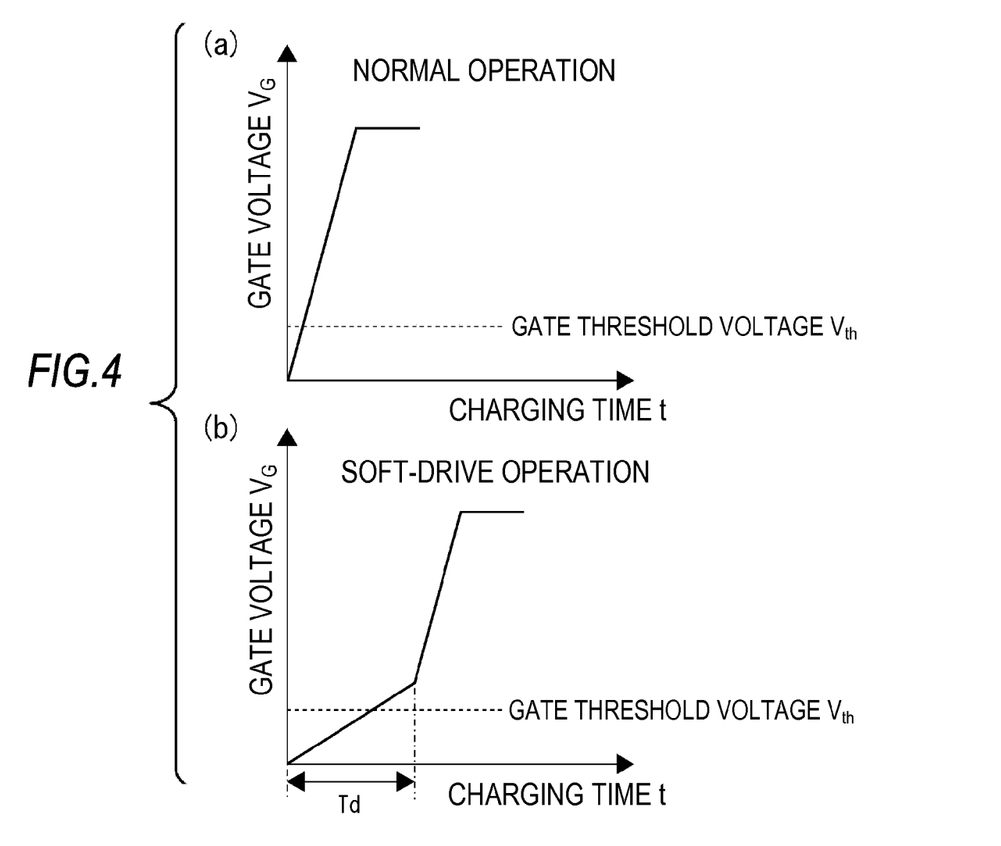
FIG. 4 is a view showing gate charging rates during a normal operation and a soft-drive operation of a switching element shown in FIG. 2.

Upon the normal operation in which the soft-drive signal has not been inputted, if the output signal of the OR circuit OR1 becomes the H level, the first on-switch element 22 and the second on-switch element 22 are all turned on, and the gate of the switching element Q1, as shown in a chart (a) of FIG. 4, is charged through the first on-drive resistor 31 and the second on-drive resistor 32, which are connected in parallel to each other. Contrarily, upon the soft-drive in which the soft-drive instruction signal has been inputted, if the output signal of the OR circuit OR1 becomes the H level, the gate of the switching element Q1, as shown in a chart (b) of FIG. 4, is first charged through only the first on-drive resistor 31 and then after a delay time Td set in the delay circuit 40 passes, is charged through the first on-drive resistor 31 and the second on-drive resistor 32, which are connected in parallel to each other. The delay time Td set in the delay circuit 40, as shown in the chart (b) of FIG. 4, is set to a time, at which a gate voltage $V_G$ of the switching element Q1, which is being charged through only the first on-drive resistor 31, exceeds a gate threshold voltage $V_{th}$. Thus, as compared to the normal operation, upon the soft drive, a resistance value of the on-drive resistors is switched to a larger value until the gate voltage $V_G$ passes the gate threshold voltage $V_{th}$, so that a charging speed of the gate voltage $V_G$ during passing the gate threshold voltage $V_{th}$ is slow and a drive (source side) speed becomes slow.

Figure 5:
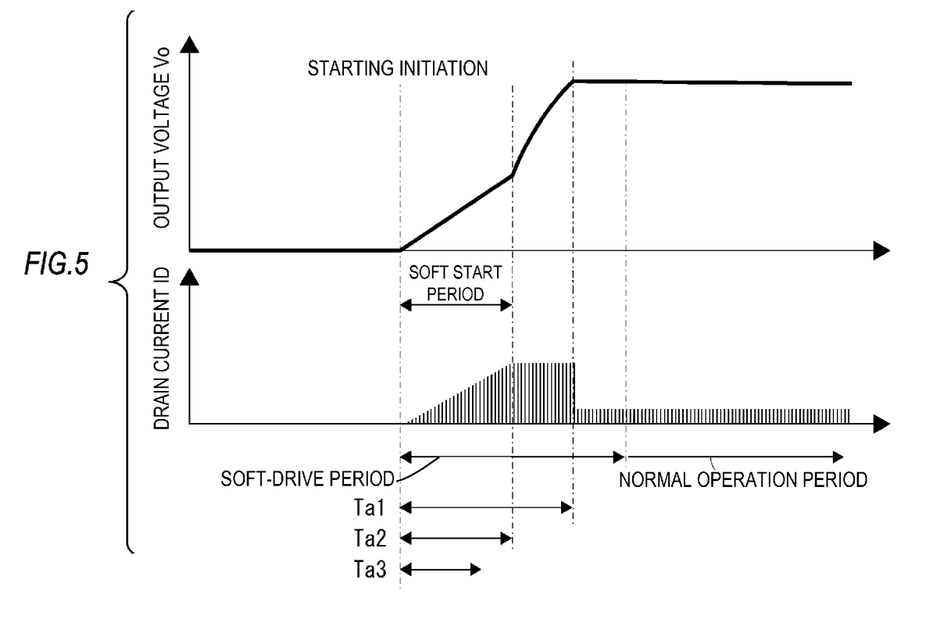
FIG. 5 is an explanatory view explaining a soft-drive period set by a timer circuit shown in FIG. 2.
Figure 6:
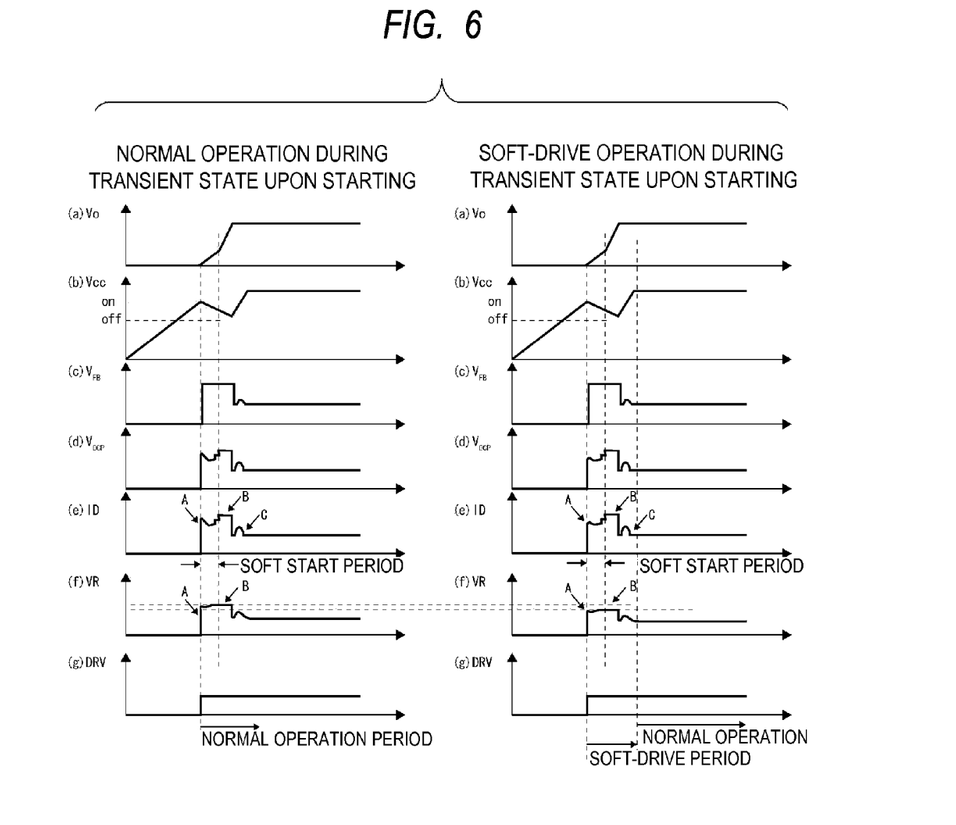
FIG. 6 is a waveform diagram showing a signal waveform and an operation waveform of each part in a case where the normal operation is performed from a time of starting and a case where the soft-drive operation is performed upon starting.
Figure 7:
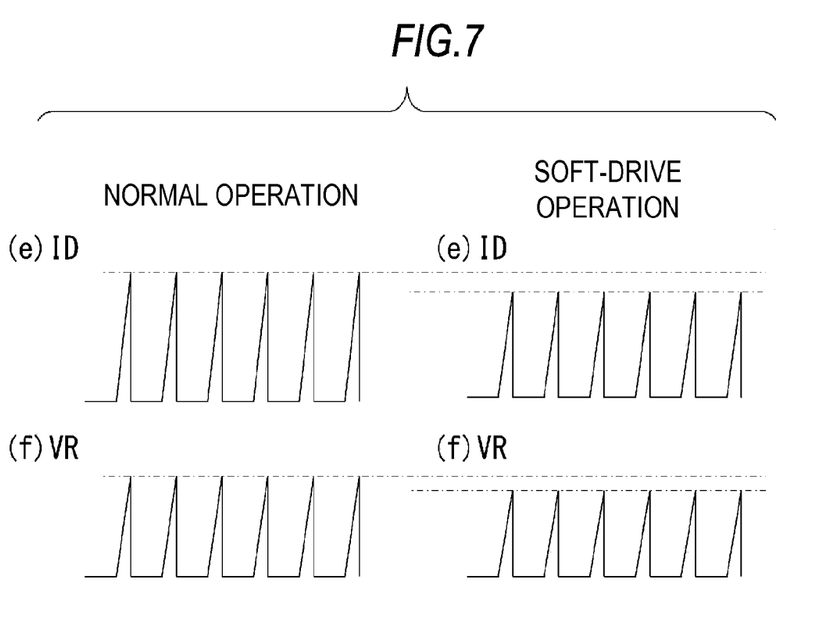
FIG. 7 is an enlarged waveform diagram of a drain current ID and a reverse voltage VR shown by an arrow A in FIG. 6.
Figure 8:
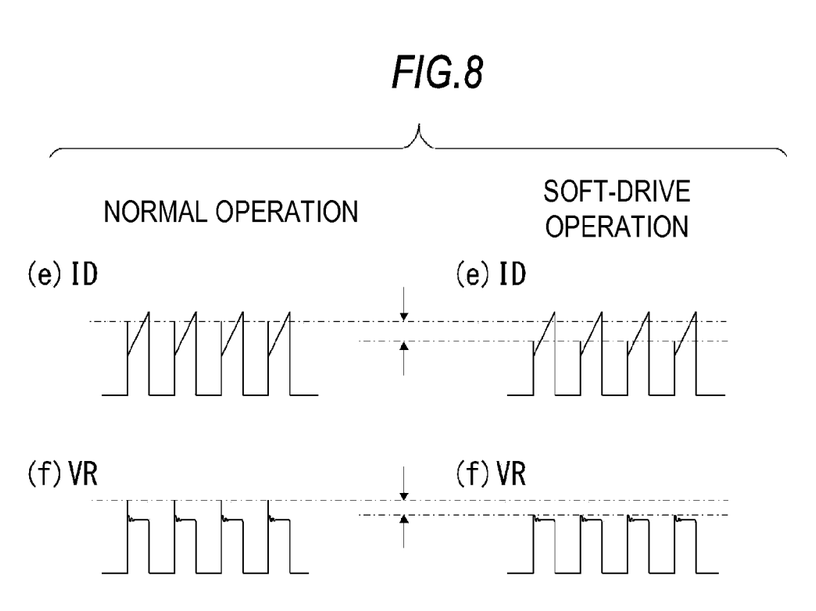
FIG. 8 is an enlarged waveform diagram of a drain current ID and a reverse voltage VR shown by an arrow B in FIG. 6.

The soft-drive period Ta, during which the timer circuit 14 outputs the soft-drive instruction signal, as shown in FIG. 5 is set to be longer than a period of time from the starting initiation until an output voltage Vo is increased to the steady voltage, including a transient state upon starting. FIGS. 6 to 8 are waveforms comparing a signal waveform and an operation waveform of each part in a case where the normal operation is performed upon the transient state upon starting, with a signal waveform and an operation waveform of each part in a case where the soft-drive operation is performed upon the transient state upon starting. In FIG. 6, a chart (a) shows the output voltage Vo, a chart (b) shows the IC power-source voltage Vcc, a chart (c) shows the voltage signal $V_{FB}$ of the FB/OLP terminal, a chart (d) shows the voltage signal $V_{ocp}$ of the S/OCP terminal, a chart (e) shows the drain current ID, a chart (f) shows a reverse voltage VR of the diode D1, and a chart (g) shows the driving signal DRV of the switching element Q1.

If the smoothing capacitor C3 is charged by the starting circuit (not shown) and as shown in the chart (b) of FIG. 6, the IC power-source voltage Vcc reaches an operation initiation voltage Von, the controller IC 1 is started up. In a period of time immediately after starting as shown by an arrow A in the charts (e) to (f) of FIG. 6, the controller IC 1 performs a soft start control and stops a leading edge blanking function and then is operated by only a discharging current (drain current ID) upon turn-on thereof. During such a period of time, during which the controller is operated by only the discharging current upon turn-on, the soft-drive operation is performed so that as shown in the chart (e) of FIG. 7, a gradient of the drain current ID is changed as compared to the normal operation. Also, during the period of time, during which the controller is operated by only the discharging current, the switching element Q1 is operated in a minimum on time. Thus, as shown in the chart (e) of FIG. 7, a peak of the drain current ID can be limited, and as shown in the chart (f) of FIG. 7, the reverse voltage VR, which would be generated in the rectifier diode D1 on the secondary side or the rectifier diode D2 of the IC power-source voltage Vcc, can be also limited.

In a period of time until the output voltage Vo reaches the steady voltage after the soft start control is ended as shown by an arrow B in the charts (e) to (f) of FIG. 6, the controller IC 1 activates the leading edge blanking function. Even in this case, the soft-drive operation is performed so that as shown in the chart (e) of FIG. 7, the discharging current upon turn-on (drain current ID) can be limited, and also as shown in the chart (f) of FIG. 7, the reverse voltage VR, which would be generated in the rectifier diode D1 on the secondary side or the rectifier diode D2 of the IC power-source voltage Vcc, can be limited.

After the output voltage Vo reaches the steady voltage, there is a possibility that as shown by an arrow C in FIG. 6 the chart (e), the drain current ID increases while oscillating due to responsibility of a feedback control. Thus, the soft-drive operation can be also performed during a period of time, during which the drain current ID oscillates after the output voltage Vo reaches the steady voltage, so that the drain current ID can be limited and also the reverse voltage VR, which would be generated in the rectifier diode D1 on the secondary side or the rectifier diode D2 of the IC power-source voltage Vcc, can be limited.

Additionally, the first embodiment is configured so that the soft-drive period Ta upon starting includes a period from a time of starting until the drain current ID oscillates due to responsibility of the feedback control after the output voltage Vo reaches the steady voltage. However, a certain effect can be obtained even if the soft-drive period is set to a period ta1 from a time of starting until the output voltage Vo reaches the steady voltage as shown in FIG. 5. Also, if the soft-drive period is set to a soft start period ta2, the soft-drive period does not need to be separately generated, thereby simplifying the circuit configuration. In addition, a certain effect can be obtained even if the soft-drive period is set to a period ta3 shorter than the soft start period ta2.

Further, referring to FIG. 2, the FB/OLP terminal is connected to an input terminal of the overload detection circuit 15. The overload detection circuit 15 compares the voltage signal $V_{FB}$ of the FB/OLP terminal to a preset overload threshold voltage, thereby detecting an overload state. In addition, if the overload state is detected, the overload detection circuit 15 generates the preset soft-drive period Tb and outputs the soft-drive instruction signal to the drive circuit 11 during the soft-drive period Tb. Thus, the discharging current (drain current ID) upon turn-on can be limited, and then the reverse voltage VR, which would be generated in the rectifier diode D1 on the secondary side or the rectifier diode D2 of the IC power-source voltage Vcc, can be limited.

As described above, according to the first embodiment discloses the switching power-supply device, in which an input power is applied to the primary winding P of the transformer T, a pulse voltage is induced in the secondary winding S of the transformer T by turning on and off the switching element Q1 connected to the primary winding P of the transformer T, and then the output voltage Vo rectified and smoothed by a secondary-side rectifying-and-smoothing circuit having a rectifier diode D1 and a smoothing capacitor C1 is outputted. The switching power-supply device includes a transient state detection circuit (timer circuit 14 and overload detection circuit 15) for detecting a transient state and outputting a soft-drive instruction signal, and a drive circuit 11 for turning on and off the switching element Q1 in a soft-drive operation, in which a charging speed of a gate voltage at a time of passing a gate threshold voltage is delayed as compared to a normal operation, in a case where the soft-drive instruction signal is inputted.

Due to this configuration, a discharging current upon turn-on can be limited and then a surge voltage which would be generated in rectifier diodes can be limited, thereby diodes having a lower withstand voltage is to be used as rectifier diodes for the secondary side or the IC power-supply voltage Vcc. By using such lower withstand voltage rectifier diodes, costs can be reduced. In addition, as compared to higher withstand voltage rectifier diodes (e.g., high-speed rectifier diodes), the lower withstand voltage rectifier diodes (e.g., Schottky barrier diodes) have a lower forward voltage VF, thereby achieving an improvement in power-supply efficiency. Specifically, upon a light load, an influence degree to a loss in the forward voltage VF of the rectifier diodes is large, and therefore rectifier diodes having a lower forward voltage VF can be used, thereby achieving a great improvement in light load efficiency.

Further, according to the first embodiment, the drive circuit 11 is configured to restore the charging speed of the gate voltage to the speed in the normal operation after the gate voltage passes the gate threshold voltage.

Due to this configuration, an on-resistance of the switching element Q1 upon the soft-drive operation can be limited.

Further, according to the first embodiment, the timer circuit 14 is configured to detect, as the transient state, a preset period from a time of starting and then to output the soft-drive instruction signal.

Due to this configuration, while being operated by only the discharging current upon turn-on, a peak of the drain current ID of the switching element Q1 can be limited, and a reverse voltage VR, which would be generated in the rectifier diode D1 on the secondary side or the rectifier diode D2 of the IC power-source voltage Vcc, can be also limited.

Further, according to the first embodiment, the timer circuit 14 is configured to detect, as the transient state, a period from a time of starting until the drain current ID of the switching element Q oscillates due to responsibility of a feedback control after the output voltage Vo reaches a steady voltage.

Due to this configuration, after the soft start control is ended, during a period of time until the output voltage Vo reaches the steady voltage or during a period of time during which the drain current ID oscillates due to responsibility of the feedback control, a peak of the drain current ID of the switching element Q1 can be limited, and a reverse voltage VR, which would be generated in the rectifier diode D1 on the secondary side or the rectifier diode D2 of the IC power-source voltage Vcc, can be also limited.

Further, according to the first embodiment, the overload detection circuit 15 is configured to detect, as the transient state, an overload state detected by a feedback signal from the secondary side and then to output the soft-drive instruction signal during a preset period of time.

Due to this configuration, in the overload state, a peak of the drain current ID of the switching element Q1 can be limited, and a reverse voltage VR, which would be generated in the rectifier diode D1 on the secondary side or the rectifier diode D2 of the IC power-source voltage Vcc, can be also limited.

(Second Embodiment)

Figure 9:
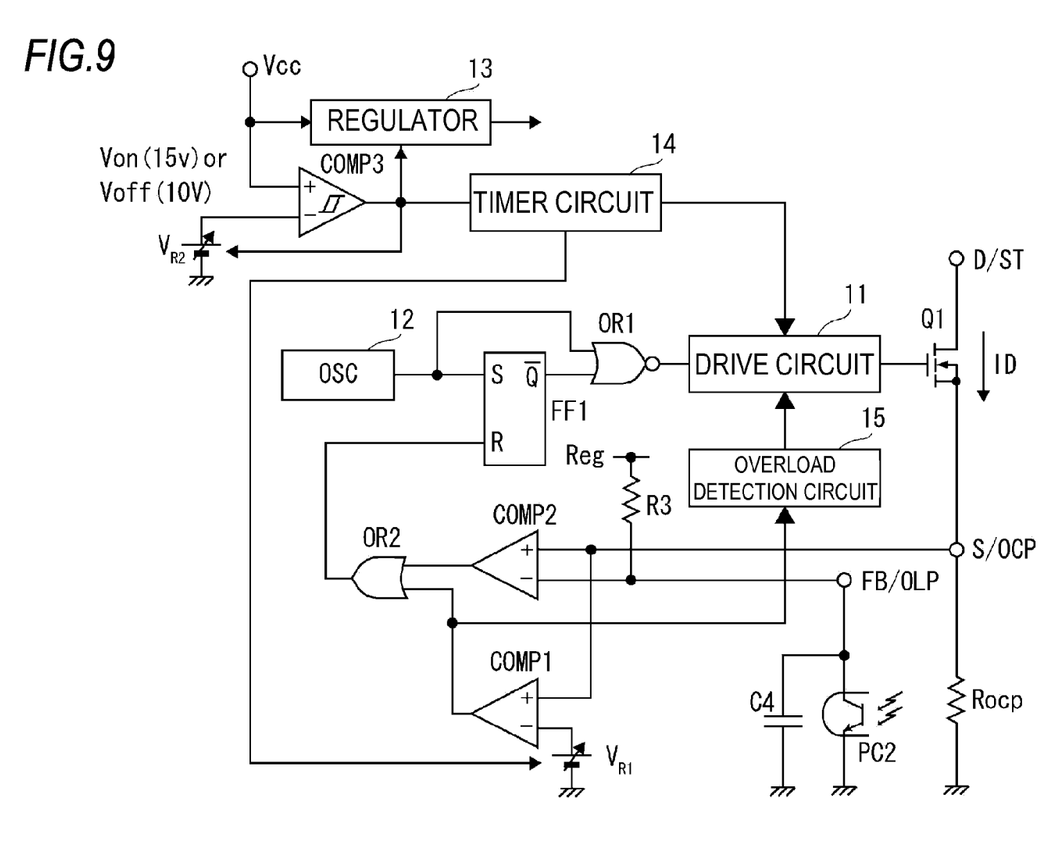
FIG. 9 is a circuit configuration diagram showing a circuit configuration of a second embodiment of a controller IC shown in FIG. 1.

Referring to FIG. 9, a second embodiment is different from the first embodiment, in that an output terminal of the comparator COMP1 is connected to an input terminal of the overload detection circuit 15 and the overload detection circuit 15 detects the overload state if an H level output signal is outputted from the comparator COMP 1. Namely, because the voltage signal $V_{ocp}$ of the S/OCP terminal which is detected as the drain current ID follows the voltage signal $V_{FB}$ of the FB/OLP terminal, the second embodiment is configured to detect the overload state on the basis of the drain current ID and then to perform the soft-drive operation.

As described above, according to the second embodiment, the overload detection circuit 15 is configured to detect, as the transient state, an overload state detected by the drain current ID of the switching element Q1 and then to output the soft-drive instruction signal during a preset period of time.

Due to this configuration, in the overload state, a peak of the drain current ID of the switching element Q1 can be limited, and a reverse voltage VR, which would be generated in the rectifier diode D1 on the secondary side or the rectifier diode D2 of the IC power-source voltage Vcc, can be also limited.

(Third Embodiment)

Figure 10:
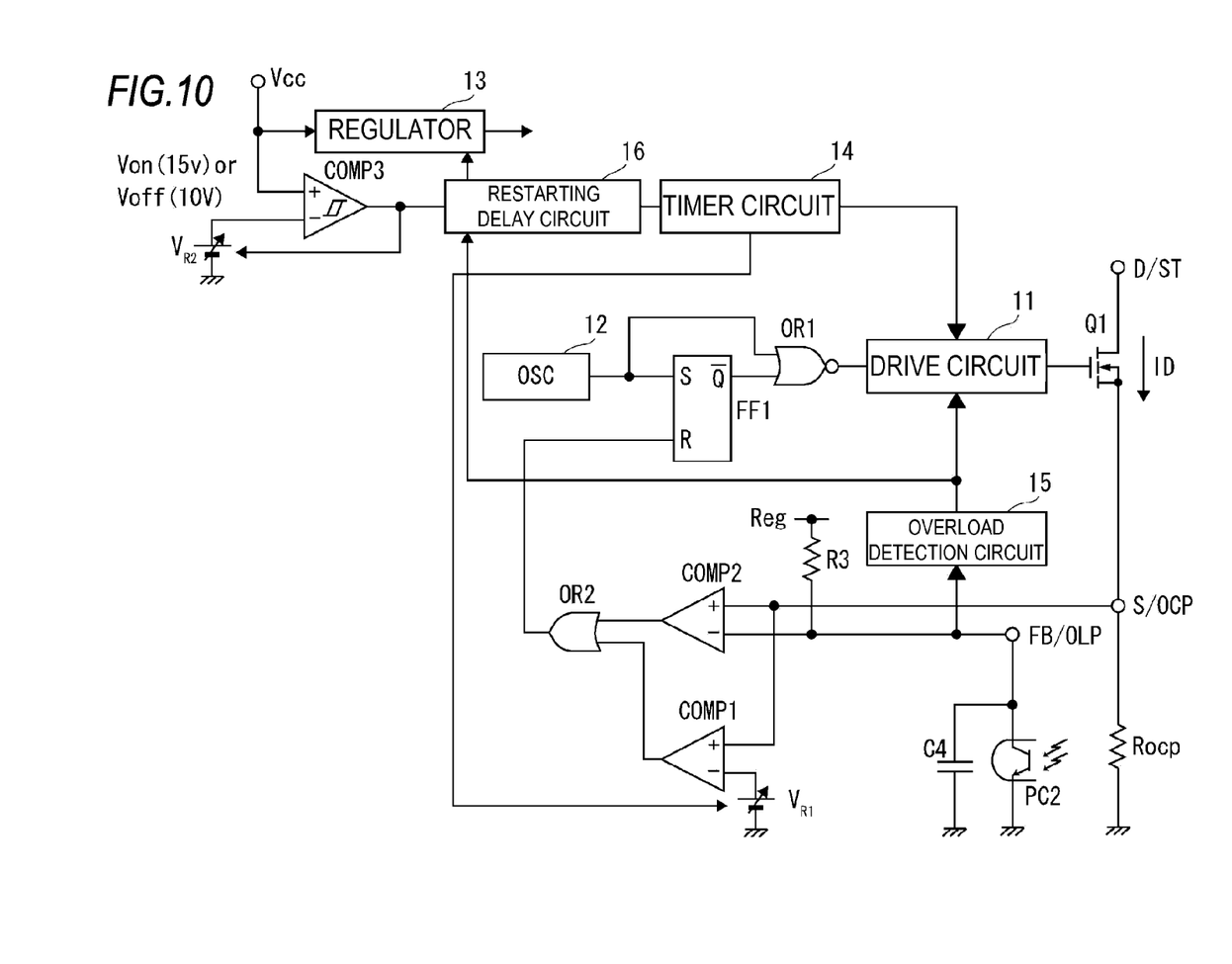
FIG. 10 is a circuit configuration diagram showing a circuit configuration of a second embodiment of a controller IC shown in FIG. 1.

Referring to FIG. 10, a third embodiment is provided with a restarting delay circuit 16, in addition to the configurations of the first embodiment. The restarting delay circuit 16 delays an auto-restart cycle if the soft-drive instruction signal from the overload detection circuit 15 is inputted thereto. Namely, in this disclosure, heat generation of the switching element Q1 is increased because the soft-drive operation is performed if the overload state is detected. Therefore, by delaying the auto-restart cycle, the number of oscillations (repeat intervals of switching driving operations) can be limited, thereby inhibiting heat generation of the switching element Q1.

Figure 12:
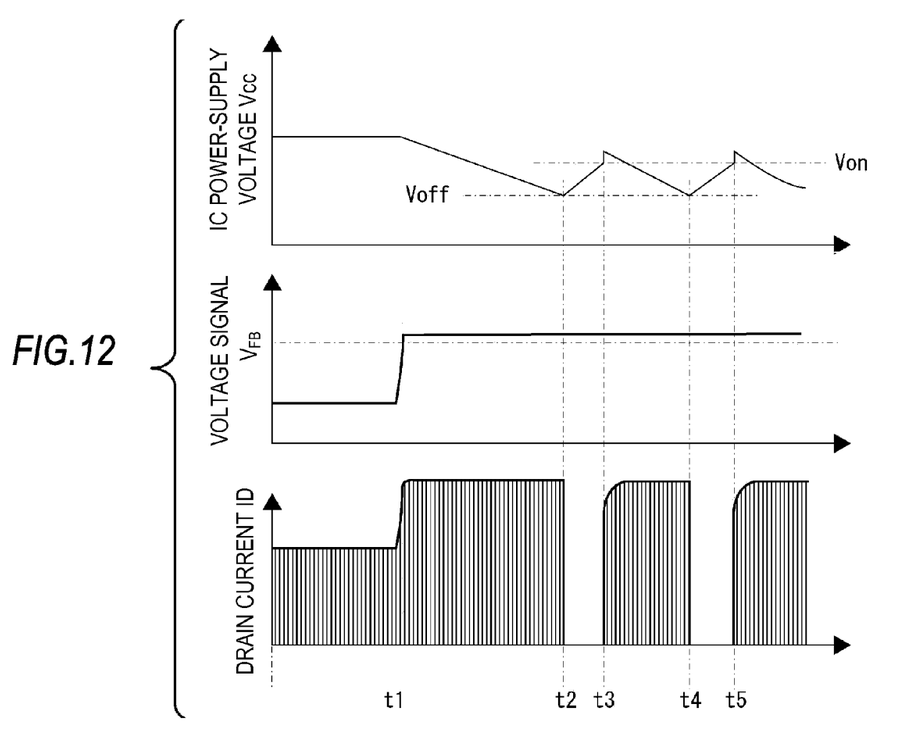
FIG. 12 is a waveform diagram showing a signal waveform and an operation waveform of each part in a case where the restarting delay circuit shown in FIG. 10 is not operated.

When the overload state is continued from a time t1 and as shown in FIG. 12, at a time t2, the IC power-source voltage Vcc is decreased to the second reference voltage Voff, an L level output signal is outputted from the comparator COMP3 and thus operation of the controller IC is stopped. In a normal auto-restart in a case where operation of the controller IC 1 is stopped, the IC power-supply voltage Vcc is charged by a starting circuit (not shown) after operation of the controller IC 1 is stopped, and then, when reaching the first reference voltage Von at a time t3, an H level output signal is outputted from the comparator COMP3, thereby starting the controller IC 1. Thus, a charging time (from a time of the second reference voltage Voff to a time of the first reference voltage Von) of the IC power-supply voltage Vcc by the starting circuit (not shown) is the auto-restart cycle, and thereafter such operation is repeated.

Figure 11:
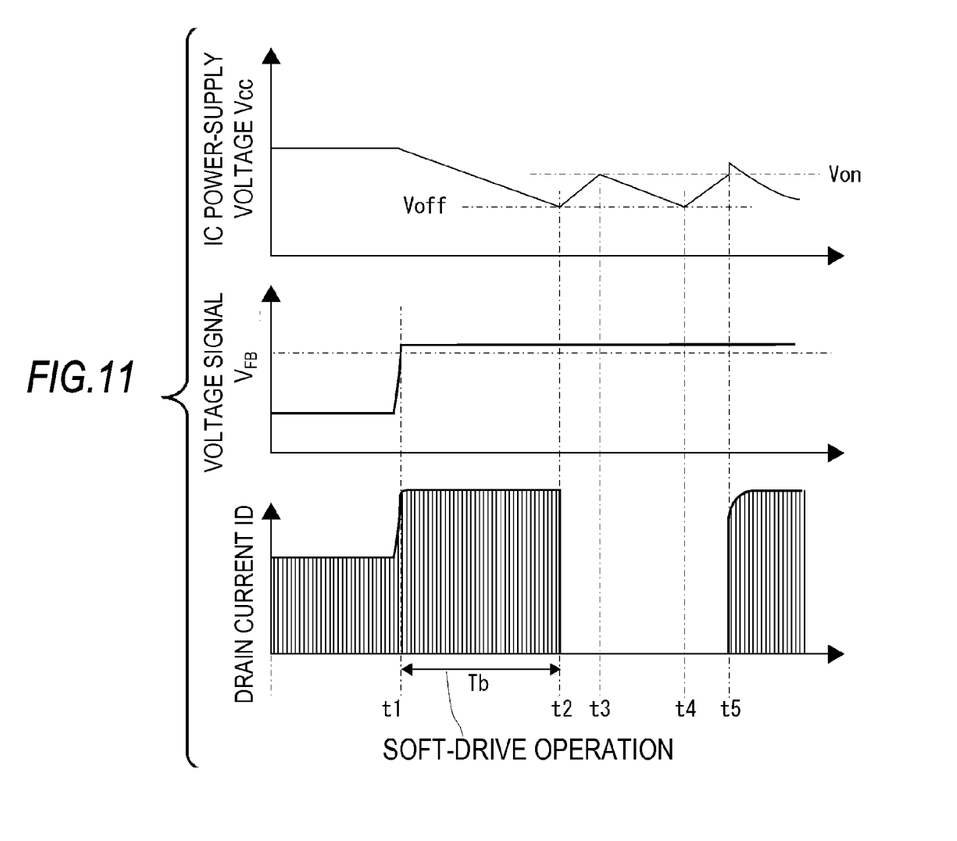
FIG. 11 is a waveform diagram showing a signal waveform and an operation waveform of each part in a case where a restarting delay circuit shown in FIG. 10 is operated.

Contrarily, in the third embodiment as shown in FIG. 11, in a case where the soft-drive instruction signal is inputted, the overload detection circuit 15 controls such that, if the IC power-supply voltage Vcc is charged by a starting circuit (not shown) after operation of the controller IC 1 is stopped and reaches the first reference voltage Von at a time t3, the H level output signal is not outputted from the comparator COMP3 at a first time. Thereafter, as the IC power-source voltage Vcc is decreased to the second reference voltage Voff at a time t4 and reaches the first reference voltage Von at a time t5, the H level output signal is outputted from the comparator COMP3 and thus the controller IC 1 is started. In this case, the auto-restart cycle is a period of time obtained by adding a discharging time (from the first reference voltage Von to the second reference voltage Voff) of the IC power-source voltage Vcc to two charging times (from the second reference voltage Voff to the first reference voltage Von) of the IC power-supply voltage Vcc by the starting circuit, not shown. Accordingly, upon restarting from stop due to a continuous overload state (Tb in FIG. 11), the auto-restart cycle is delayed by at least two cycles as compared to the normal case. Therefore, the number of oscillations (repeat intervals of switching driving operations) can be limited, thereby reducing heat generation of the switching element Q1.

As described above, according to the third embodiment, the switching power-supply device has an auto-restart function of restarting the controller IC 1 for turning on and off the switching element Q1 and includes a restarting delay circuit 16 for delaying an auto-restart cycle upon restarting from stop by the overload detection circuit 15 due to a continuous overload state (Tb in FIG. 11).

Due to this configuration, heat generation of the switching element Q1 is increased, so that the soft-drive operation is performed in the overload state is detected. However, the number of oscillations (repeat intervals of switching driving operations) can be limited, thereby inhibiting heat generation of the switching element Q1.

In the foregoing, although specific embodiments of this disclosure have been explained, such embodiments are only examples, and various changes thereof may be made without departing from the spirit and the scope of the disclosure.

What is claimed is:

1. A switching power-supply device, in which an input power is applied to a primary winding of a transformer, a pulse voltage is induced in a secondary winding of the transformer by turning on and off a switching element connected to the primary winding of the transformer and an output voltage rectified and smoothed by a secondary-side rectifying-and- smoothing circuit having a rectifier diode and a smoothing capacitor is outputted, the switching power-supply device comprising:
   a transient state detection circuit, which detects a transient state and outputs a soft-drive instruction signal; and
   a drive circuit which turns on-and-off the switching element in a soft-drive operation, in which a charging speed of a gate voltage at a time of passing a gate threshold voltage is delayed as compared to a normal operation, in a case where the soft-drive instruction signal is inputted,
   wherein the transient state detection circuit is configured to detect, as the transient state, a period from a time of starting until a drain current of the switching element oscillates due to responsibility of a feedback control after the output voltage reaches a steady voltage,
   wherein the transient state detection circuit is configured to detect, as the transient state, an overload state detected by a feedback signal from the secondary side and to output the soft-drive instruction signal during a preset period of time,
   wherein the switching power-supply device has an auto-restart function of restarting to turn on-and-off the switching element, and
   wherein the switching power-supply device comprises a restarting delay circuit to delay an auto-restart cycle upon restarting from stop due to a continuous overload state.

2. The switching power-supply device according to claim 1, wherein the drive circuit is configured to restore the charging speed of the gate voltage to a speed in the normal operation after the gate voltage passes the gate threshold voltage.

3. The switching power-supply device according to claim 1, wherein the transient state detection circuit is configured to detect, as the transient state, a preset period from a time of starting to output the soft-drive instruction signal.

4. The switching power-supply device according to claim 1, wherein the transient state detection circuit is configured to detect, as the transient state, an overload state detected by a drain current of the switching element and to output the soft-drive instruction signal during a preset period of time.

5. A switching power-supply device, in which an input power is applied to a primary winding of a transformer, a pulse voltage is induced in a secondary winding of the transformer by turning on and off a switching element connected to the primary winding of the transformer and an output voltage rectified and smoothed by a secondary-side rectifying-and-smoothing circuit having a rectifier diode and a smoothing capacitor is outputted, the switching power-supply device comprising:
   a transient state detection circuit, which detects a transient state and outputs a soft-drive instruction signal; and
   a drive circuit which turns on-and-off the switching element in a soft-drive operation, in which a charging speed of a gate voltage at a time of passing a gate threshold voltage is delayed as compared to a normal operation, in a case where the soft-drive instruction signal is inputted,
   wherein the transient state detection circuit is configured to detect, as the transient state, an overload state detected by a feedback signal from the secondary side and to output the soft-drive instruction signal during a preset period of time,
   wherein the switching power-supply device has an auto-restart function of restarting to turn on-and-off the switching element, and
   wherein the switching power-supply device comprises a restarting delay circuit to delay an auto-restart cycle upon restarting from stop due to a continuous overload state.

* * * * *